United States Patent
Aguilar-Macias et al.

(10) Patent No.: US 7,844,999 B1
(45) Date of Patent: Nov. 30, 2010

(54) MESSAGE PARSING IN A NETWORK SECURITY SYSTEM

(75) Inventors: Hector Aguilar-Macias, Sunnyvale, CA (US); Rajiv Subrahmanyam, Chennas (IN)

(73) Assignee: ArcSight, Inc., Sunnyvale, CA (US)

( * ) Notice: Subject to any disclaimer, the term of this patent is extended or adjusted under 35 U.S.C. 154(b) by 953 days.

(21) Appl. No.: 11/070,024

(22) Filed: Mar. 1, 2005

(51) Int. Cl.
- G06F 7/04 (2006.01)
- G06F 3/00 (2006.01)
- G06F 9/00 (2006.01)
- G06F 15/173 (2006.01)
- H04L 29/06 (2006.01)

(52) U.S. Cl. .............. 726/3; 726/11; 726/23; 713/151; 719/317; 719/318; 709/224; 709/225

(58) Field of Classification Search ............ 726/3, 726/11, 23; 713/151; 719/317, 318; 709/224, 709/225
See application file for complete search history.

(56) References Cited

U.S. PATENT DOCUMENTS

| | | | |
|---|---|---|---|
| 5,557,742 | A | 9/1996 | Smaha et al. |
| 5,717,919 | A | 2/1998 | Kodavalla et al. |
| 5,802,178 | A * | 9/1998 | Holden et al. ............ 713/151 |
| 5,850,516 | A | 12/1998 | Schneier |
| 5,956,404 | A | 9/1999 | Schneier et al. |
| 5,963,742 | A * | 10/1999 | Williams .............. 717/143 |
| 5,978,475 | A | 11/1999 | Schneier et al. |
| 6,009,203 | A * | 12/1999 | Liu et al. ............... 382/233 |
| 6,070,244 | A | 5/2000 | Orchier et al. |
| 6,134,664 | A | 10/2000 | Walker |
| 6,192,034 | B1 | 2/2001 | Hsieh et al. |
| 6,275,942 | B1 | 8/2001 | Bernhard et al. |
| 6,321,338 | B1 | 11/2001 | Porras et al. |
| 6,408,391 | B1 | 6/2002 | Huff et al. |

(Continued)

FOREIGN PATENT DOCUMENTS
WO   WO 02/045315 A2   6/2002

(Continued)

OTHER PUBLICATIONS
Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

(Continued)

*Primary Examiner*—William R Korzuch
*Assistant Examiner*—Sarah Su
(74) *Attorney, Agent, or Firm*—Fenwick & West LLP

(57) ABSTRACT

Device discovery can be made efficient using certain embodiments of the present invention. In one embodiment, the present invention includes accessing a message in a message log, wherein the message log associates a host identifier with the message, the host identifier being an identifier of a host that sent the message to the message log. Then a list of parsers associated with the host identifier associated with the message can be accessed and parsing the message using parsers from the list of parsers associated with the host identifier can be attempted. If the parsing is unsuccessful, a device type of an originator of the message can be discovered, and a parser associated with the discovered device type can be added to the list of parsers associated with the host identifier.

30 Claims, 4 Drawing Sheets

U.S. PATENT DOCUMENTS

| | | |
|---|---|---|
| 6,408,404 B1 | 6/2002 | Ladwig |
| 6,484,203 B1 | 11/2002 | Porras et al. |
| 6,542,075 B2 | 4/2003 | Barker et al. |
| 6,694,362 B1 | 2/2004 | Secor et al. |
| 6,704,874 B1 | 3/2004 | Porras et al. |
| 6,708,212 B2 | 3/2004 | Porras et al. |
| 6,711,615 B2 | 3/2004 | Porras et al. |
| 6,839,850 B1 | 1/2005 | Campbell et al. |
| 6,907,564 B1* | 6/2005 | Burchhardt et al. ......... 715/210 |
| 6,928,556 B2 | 8/2005 | Black et al. |
| 6,966,015 B2 | 11/2005 | Steinberg et al. |
| 6,985,920 B2 | 1/2006 | Bhattacharya et al. |
| 6,988,208 B2 | 1/2006 | Hrabik et al. |
| 7,039,953 B2 | 5/2006 | Black et al. |
| 7,043,727 B2 | 5/2006 | Bennett et al. |
| 7,089,428 B2 | 8/2006 | Farley et al. |
| 7,127,743 B1* | 10/2006 | Khanolkar et al. ............ 726/23 |
| 7,159,237 B2 | 1/2007 | Schneier et al. |
| 7,171,689 B2 | 1/2007 | Beavers |
| 7,188,346 B2* | 3/2007 | Martin et al. ............... 719/318 |
| 7,191,362 B2* | 3/2007 | Boudnik et al. ............... 714/33 |
| 7,219,239 B1 | 5/2007 | Njemanze et al. |
| 7,260,844 B1 | 8/2007 | Tidwell et al. |
| 7,278,160 B2 | 10/2007 | Black et al. |
| 7,308,689 B2 | 12/2007 | Black et al. |
| 7,333,999 B1 | 2/2008 | Njemanze |
| 7,376,969 B1 | 5/2008 | Njemanze et al. |
| 7,483,972 B2 | 1/2009 | Bhattacharya et al. |
| 7,596,793 B2 | 9/2009 | Grabarnik et al. |
| 7,644,365 B2 | 1/2010 | Bhattacharya et al. |
| 2002/0019945 A1 | 2/2002 | Houston et al. |
| 2002/0099958 A1 | 7/2002 | Hrabik et al. |
| 2002/0104014 A1 | 8/2002 | Zobel et al. |
| 2002/0141449 A1* | 10/2002 | Johnson ..................... 370/473 |
| 2002/0147803 A1 | 10/2002 | Dodd et al. |
| 2002/0184532 A1 | 12/2002 | Hackenberger et al. |
| 2003/0084349 A1 | 5/2003 | Friedrichs et al. |
| 2003/0093514 A1 | 5/2003 | Valdes et al. |
| 2003/0093692 A1 | 5/2003 | Porras |
| 2003/0101358 A1 | 5/2003 | Porras et al. |
| 2003/0187972 A1* | 10/2003 | Bauchot ..................... 709/223 |
| 2003/0188189 A1 | 10/2003 | Desai et al. |
| 2003/0221123 A1 | 11/2003 | Beavers |
| 2004/0010718 A1 | 1/2004 | Porras et al. |
| 2004/0024864 A1 | 2/2004 | Porras et al. |
| 2004/0044912 A1 | 3/2004 | Connary et al. |
| 2004/0221191 A1 | 11/2004 | Porras et al. |
| 2005/0022207 A1* | 1/2005 | Grabarnik et al. ........... 719/313 |
| 2005/0027845 A1 | 2/2005 | Secor et al. |
| 2005/0204404 A1 | 9/2005 | Hrabik et al. |
| 2005/0251860 A1 | 11/2005 | Saurabh et al. |
| 2006/0069956 A1 | 3/2006 | Steinberg et al. |
| 2006/0095587 A1 | 5/2006 | Bhattacharya et al. |
| 2006/0101516 A1* | 5/2006 | Sudaharan et al. ............ 726/23 |
| 2006/0168515 A1* | 7/2006 | Dorsett et al. ............... 715/513 |
| 2006/0212932 A1 | 9/2006 | Patrick et al. |
| 2007/0118905 A1 | 5/2007 | Morin et al. |
| 2007/0136437 A1 | 6/2007 | Shankar et al. |
| 2007/0150579 A1 | 6/2007 | Morin et al. |
| 2007/0162973 A1 | 7/2007 | Schneier et al. |
| 2007/0169038 A1 | 7/2007 | Shankar et al. |
| 2007/0234426 A1 | 10/2007 | Khanolkar et al. |
| 2007/0260931 A1 | 11/2007 | Aguilar-Macias et al. |
| 2008/0104046 A1 | 5/2008 | Singla et al. |
| 2008/0104276 A1 | 5/2008 | Lahoti et al. |
| 2008/0162592 A1 | 7/2008 | Huang et al. |
| 2008/0165000 A1 | 7/2008 | Morin et al. |
| 2009/0157574 A1* | 6/2009 | Lee .............................. 706/12 |
| 2010/0058165 A1 | 3/2010 | Bhattacharya et al. |
| 2010/0083281 A1* | 4/2010 | Malladi et al. .............. 719/317 |

FOREIGN PATENT DOCUMENTS

| | | |
|---|---|---|
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

Arcsight, "About ArcSight Team," date unknown, [online] [Retrieved on Oct. 25, 2002] Retrieved from the Internet <URL: http://www.arcsight.com/about_team.htm>.

Arcsight, "About Overview," Oct. 14, 2002, [online] [Retrieved on Apr. 21, 2006] Retrieved from the Internet <URL: http://web.archive.org/web/20021014041614/http://www.arcsight.com/about.htm>.

Arcsight, "Contact Info," date unknown, [online] [Retrieved on Oct. 25, 2002] Retrieved from the Internet <URL: http://www.arcsight.com/contact.htm>.

Arcsight, "Enterprise Coverage: Technology Architecture," date unknown, [online] Retrieved from the Internet <URL: http://www.snaiso.com/Documentation/Arcsight/arcsight_archdta.pdf>.

Arcsight, "Managed Process: ArcSight Reporting System," date unknown, [online] Retrieved from the Internet <URL: http://www.snaiso.com/Documentation/Arcsight/arcsight_reportsys.pdf>.

Arcsight, "Managed Process: Console-Based Management," date unknown, [online] Retrieved from the Internet <URL: http://www.snaiso.com/Documentation/Arcsight/arcsight_console.pdf >.

Arcsight, "Precision Intelligence: SmartRules™ and Cross-Correlation," date unknown, [online] Retrieved from the Internet <URL: http://www.snaiso.com/Documentation/Arcsight/arcsight_correlation.pdf>.

Arcsight, "Precision Intelligence: SmartAgent™," date unknown, [online] Retrieved from the Internet <URL: http://www.ossmanagement.com/SmartAgent.pdf>.

Arcsight, "Product Info: Product Overview and Architecture," date unknown, [online] [Retrieved on Oct. 25, 2002] Retrieved from the Internet <URL: http://www.arcsight.com/product.htm>.

Arcsight, "Product Info: 360° Intelligence Yields Precision Risk Management," date unknown, [online] [Retrieved on Oct. 25, 2002] Retrieved from the Internet <URL: http://www.arcsight.com/product_info01.htm>.

Arcsight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

Arcsight, "Product Info: ArcSight Cross-Device Correlation," date unknown, [online] [Retrieved on Oct. 25, 2005] Retrieved from the Internet <URL: http://www.arcsight.com/product_info03.htm>.

Arcsight, "Product Info: ArcSight Manager," date unknown, [online] [Retrieved on Oct. 25, 2002] Retrieved from the Internet <URL: http://www.arcsight.com/product_info04.htm>.

Arcsight, "Product Info: ArcSight Console," date unknown, [online] [Retrieved on Nov. 15, 2002] Retrieved from the Internet <URL: http:www.arcsight.com/product_info05.htm>.
Arcsight, "Product Info: ArcSight Reporting System," date unknown, [online] [Retrieved on Oct. 25, 2002] Retrieved from the Internet <URL: http:www.arcsight.com/product_info06.htm>.
Arcsight, "Product Info: Enterprise Scaling," date unknown, [online] [Retrieved on Oct. 25, 2002] Retrieved from the Internet <URL: http://www.arcsight.com/product_info07.htm>.
Arcsight, "Security Management for the Enterprise," 2002, [online] [Retrieved on Oct. 25, 2002] Retrieved from the Internet <URL: http:www.arcsight.com/>.
Arcsight, "Technical Brief: How Correlation Eliminates False Positives," date unknown, source unknown.
Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.
Derodeff, C. "Got Correlation? Not Without Normalization," 2002, [online] Retrieved from the Internet <URL: http://www.svic.com/papers/pdf/Got-Correlation_rmalization.pdf>.
Cheung, S. et al., "EMERALD Intrusion Incident Report: 601 Message Specification," Aug. 10, 2000, System Design Laboratory, SRI International.
National Institute of Standards and Technology (NIST), "Federal Information Processing Standards Publication (FIPS PUB) 199: Standards for Security Categorization of Federal Information and Information Systems", Feb. 2004.
Haley Enterprise, "Production Systems," 2002, [online] [Retrieved on Oct. 29, 2002] Retrieved from the Internet <URL: http://www.haley.com/0072567836705810/ProductionSystems.html>.
Haley Enterprise, "The Rete Algorithm," 2002, [online] [Retrieved on Oct. 29, 2002] Retrieved from the Internet <URL: http://www.haley.com/0072567836705810/ReteAlgorithm.html>.
Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.
Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.
Lindqvist, U. et al., "Detecting Computer and Network Misuse Through the Production-Based Expert System Toolset (P-Best)," Proceedings of the IEEE Symposium on Security and Privacy, Oakland, California, May 9-12, 1999.
CERT Coordination Center, "Overview of Attack Trends," 2002, [online] Retrieved from the Internet <URL: http://www.cert.org/archive/pdf/attack_trends.pdf>.
Porras, P.A. et al., "EMERALD: Event Monitoring Enabling Responses to Anomalous Live Disturbances," Oct. 1997, Proceedings of the 20th NIST-NCSC National Information Systems Security (NISS) Conference.
Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.
Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.
Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.
National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.
Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.
U.S. Appl. No. 60/405,921, filed Aug. 26, 2002, Gisby et al.
U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004..
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.

* cited by examiner

MESSAGE PARSING IN A NETWORK SECURITY SYSTEM

FIELD OF THE INVENTION

The present invention relates to a computer-based security system, and specifically to message parsing.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (HIDS), which may exist in the form of host wrappers/personal firewalls or agent-based software, and those that operate on network data flows are called network-based IDS (NIDS). Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

Device discovery can be made efficient using certain embodiments of the present invention. In one embodiment, the present invention includes accessing a message in a message log, wherein the message log associates a host identifier with the message, the host identifier being an identifier of a host that sent the message to the message log. Then a list of parsers associated with the host identifier associated with the message can be accessed and parsing the message using parsers from the list of parsers associated with the host identifier can be attempted. If the parsing is unsuccessful, a device type of an originator of the message can be discovered, and a parser associated with the discovered device type can be added to the list of parsers associated with the host identifier.

BRIEF DESCRIPTION OF THE DRAWINGS

The present invention is illustrated by way of example, and not limitation, in the figures of the accompanying drawings in which.

DETAILED DESCRIPTION

Figure 1:
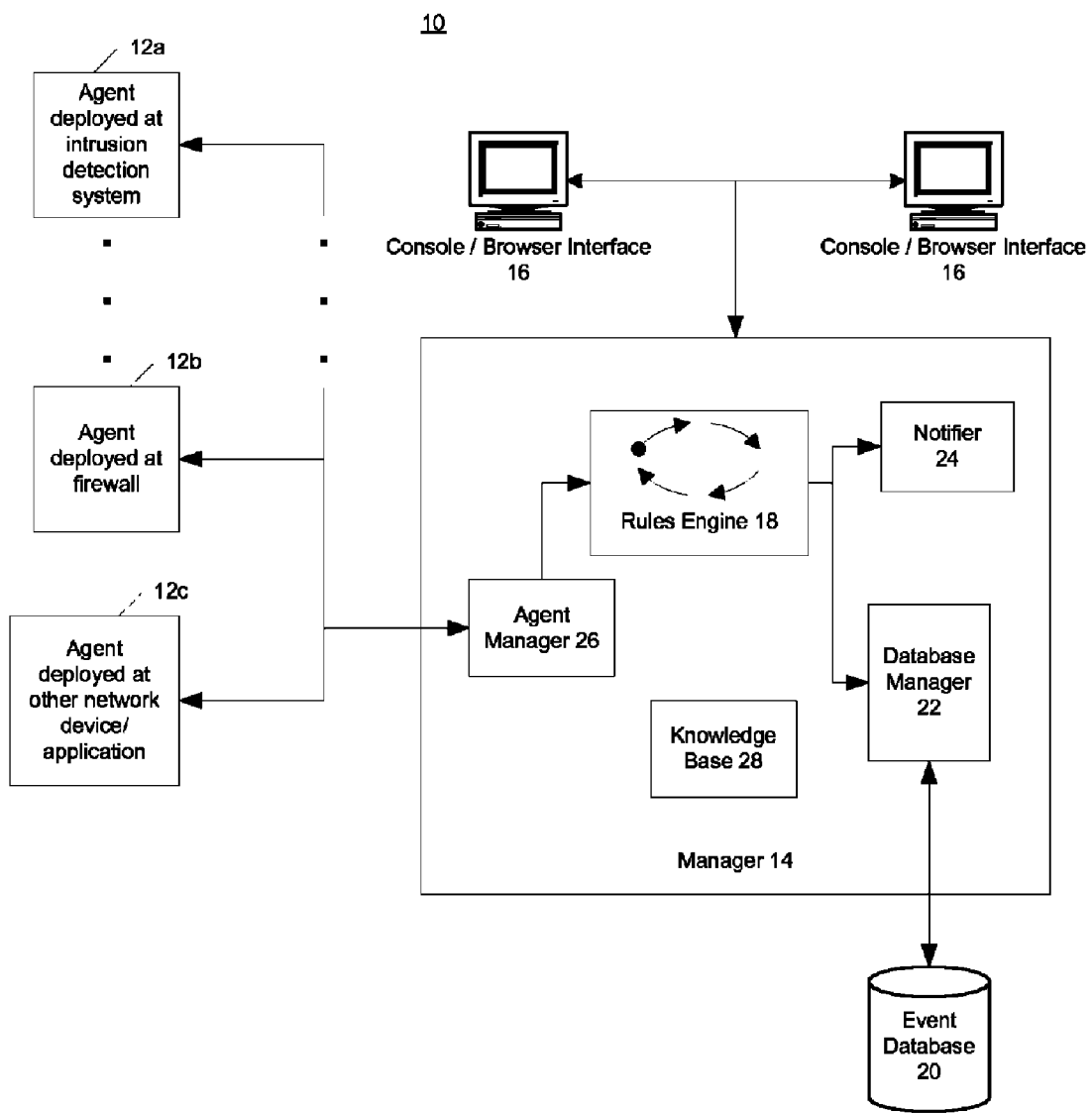
FIG. 1 is a block diagram of a network security system according to one embodiment of the present invention.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12 (12a, 12b, 12c), one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component, such as event database 20. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or hand-held computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No. 10/308,415, entitled "Real Time Monitoring and Analysis of Events from Multiple Network Security Devices", filed Dec. 2, 2002, which is hereby incorporated fully by reference.

Various attributes of the agents 12, such as event normalization (i.e., the mapping of "raw events" to some universal schema used by the network security system 10), and event aggregation, among others, are described in further detail in U.S. patent application Ser. No. 10/308,548, entitled "Modular Agent for Network Security Intrusion Detection System", filed Dec. 2, 2002, which is hereby incorporated fully by reference. As described in the referenced application, in one embodiment, the agent normalize module (e.g., block 54 in FIG. 5 of the referenced application) builds normalized security events from raw input data. One such data source an agent 12 can use to generate security events is some sort of message log or concentrator.

Examples of message logs are operating system logs, event logs, and so on. Many of these logs currently use the Syslog standard, as set forth in RFC 3164 "The BSD Syslog Protocol." Other logs use other standards and new standards may be developed in the future. Since Syslog is the current well-known message log format, it will be used in numerous examples below. However, the present invention is not limited by these Syslog-specific examples.

One example format for a message log entry is "Timestamp/Host/Message." For Syslog, the Timestamp is in the "Month/Day/Time" format, the Host is identified by an Internet Protocol (IP) address, and the Message field is unstructured text. Message logs can receive messages from numerous host devices. For example, a firewall having IP address 333.222.11.1 may log the following message with a Syslog: "%Pix-6-00001: Connection from 123.342.24.1 accepted."

For an agent 12 to use the information contained in a message to create a security event, it needs to parse the message into its constituents. A message parser can use regular expressions to match patterns and parse messages. For example, the Cisco Pix Firewall that generated the above message can generate messages matching the regular expression: "%Pix-'number'-'number': Connection from 'IP address' accepted."

Thus, if the agent can identify the host IP address 333.222.11.1 as being a Cisco Pix Firewall, the message can be parsed efficiently using a Pix Firewall Parser that contains the regular expressions associated with the message format of the Pix Firewall. However, if the agent does not know that the host IP address 333.222.11.1 is a Pix Firewall, then it must attempt to parse the message using all the possible device parsers until the host device is identified by a successful parse. This can be time consuming, especially when there is a large number of messages logged that the agent 12 is to parse.

This problem is further complicated, because the host identified in the event log is not necessarily the device responsible for the content of the message. For example the message may have been forwarded from another log to which it was sent by the originating device. Or, the message may have been forwarded by another device.

When messages are forwarded, the original host identification is lost, and the log only keeps track of the direct source of the message. So, if a Firewall logs a message with a Syslog having IP address 222.22.2.2 that forward it to another Syslog, the host in the second Syslog will be identified as 222.22.2.2, and not by the IP address of the Firewall.

Thus, a log being mined by an agent 12 may identify messages from different devices with the same host name. This complicates the task of discovering the device type associated with a host, and thus, the appropriate parser to use that corresponds with the device type of the originator of the message. Several embodiments of message parsing that address the problem of device discovery are now described with reference to FIG. 2.

Message parsing processing begins with the consideration of the next message in the message log at block 102. As explained above, the message log associates a host identifier of the host from which the log received the message with each message. The host identifier may be an Internet protocol (IP) address, host name, or other identifier. In block 104, an attempt is made to parse the message using a parser associated with the host identified by the host identifier. For example, if there are currently two parsers on the list of parsers associated with the host—e.g. a Linux host message parser and a Pix Firewall message parser—then the message would be first checked against the Pix Firewall message parser.

In block 106, a determination is made as to whether the message was successfully parsed using the applicable parser (the Pix parser in the example above). If the message was successfully parsed, then, in block 108, a security event is generated using the data extracted from the parsed message, along with other data associated with the message in the message log, such as a timestamp and the host identifier. Security event building is further described in U.S. patent application Ser. No. 10/308,548 referenced above. At this point, the processing of the current message terminates, and the next message is considered in block 102.

However, if in block 106 the determination indicates that the parsing was not successful, then, in block 110, a determination is made as to whether there are any remaining parsers associated with the host. In the example above, the Linux host message parser is still remaining to be tried. If there remain parsers on the list of parsers associated with the host to be attempted on the message, then processing proceeds from block 104, where the next parser on the list is attempted on the message.

However, if in block 110 the determination indicates that the end of the list of parsers associated with the host has been reached, then, in block 112, the device type of the originator of the message is detected. In one embodiment, this is done by attempting to parse the message using the comprehensive list of parsers available. In one embodiment, the parsers currently associated with the host need not be tried, since they were already attempted in iterations of block 104. In the example above, the detected device type may be a Snort IDS; in other words, the originator of the message was a Snort IDS.

In block 114, the message is parsed with the parser associated with the detected device type. In the example above, the message would be parsed using the Snort IDS parser. In one embodiment, parsing the message is not a separate step, since the device type is detected by the successful parsing of the message. In such an embodiment, blocks 112 and 114 are combined into a single block.

In block 116, the parser of the discovered originator device type is added to the list of parsers associated with the host. In the example above, the Snort IDS parser would be added to the Pix Firewall and Linux host message parsers on the list of parsers associated with the host. In one embodiment, the processing would then proceed to block 108, where a security event is generated, and then to block 102, where the next message is considered.

Figure 2:
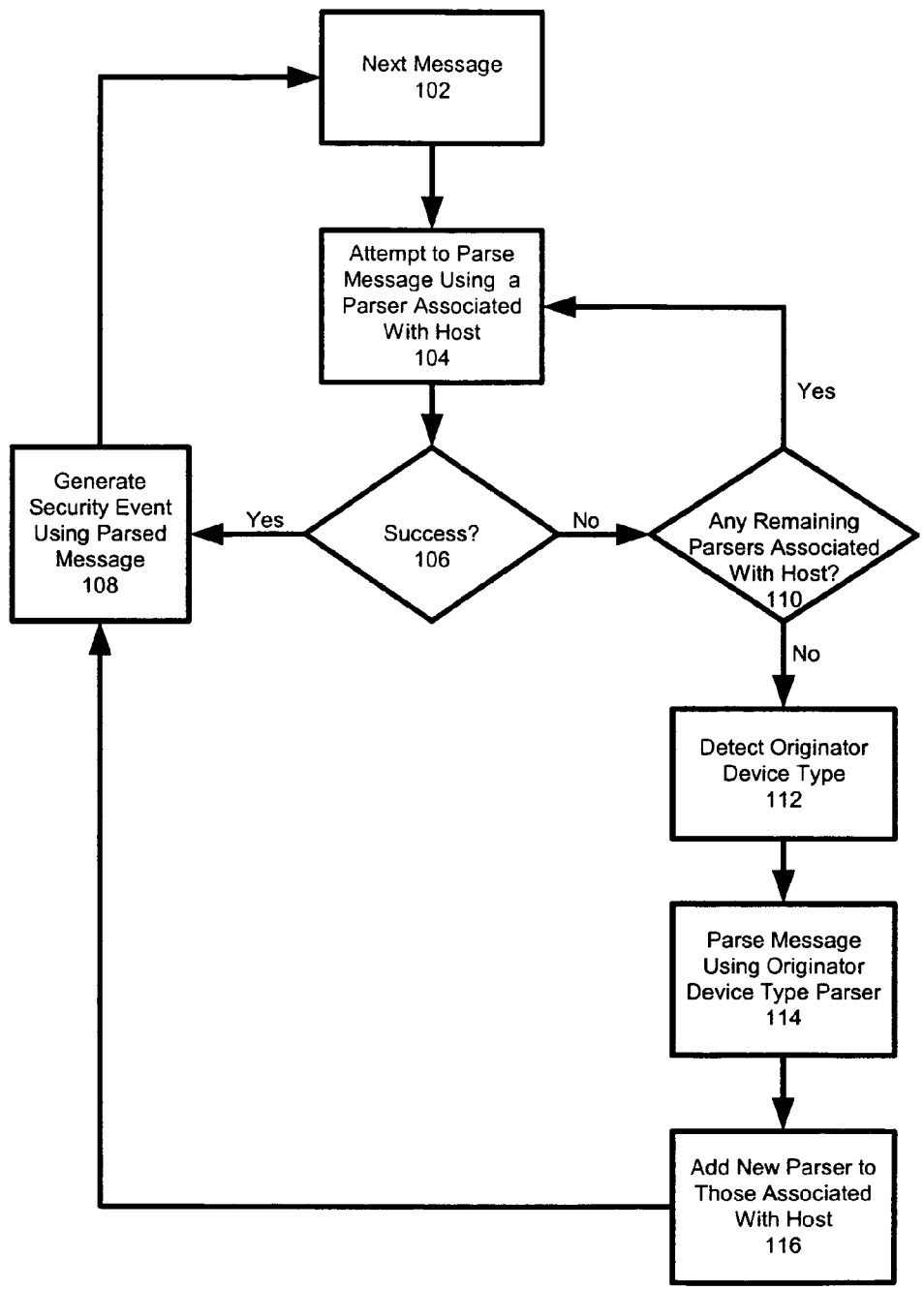
FIG. 2 is a flow diagram of message processing according to one embodiment of the present invention.

The processing shown in FIG. 2 is merely one embodiment of the present invention. Some of the blocks may be performed in different order (eg. blocks 114 and 116) while others may be omitted and yet other processing blocks added. In one embodiment, attempting to parse the message using the parsers on the list associated with the host (blocks 104-106-110-104) proceeds according to a hierarchy of the parsers. Thus, in such an embodiment, the next parser to try is selected from the list according to this hierarchy in block 104.

In one embodiment, the hierarchy for trying parsers from the list of parsers proceeds from more specific parsers to more general parsers. In the example above, the Snort IDS parser (regular expression "Snort:'String'") is tried before the Linux host parser (regular expression "'String': 'String'"). The same, or a similar, hierarchy may be used when detecting the originator device type by trying all of the available parsers in block 112. Furthermore, in one embodiment, when the new parser is added to the list in block 116, it is added in a manner that respects the hierarchy of the parsers already on the list.

Figure 3:
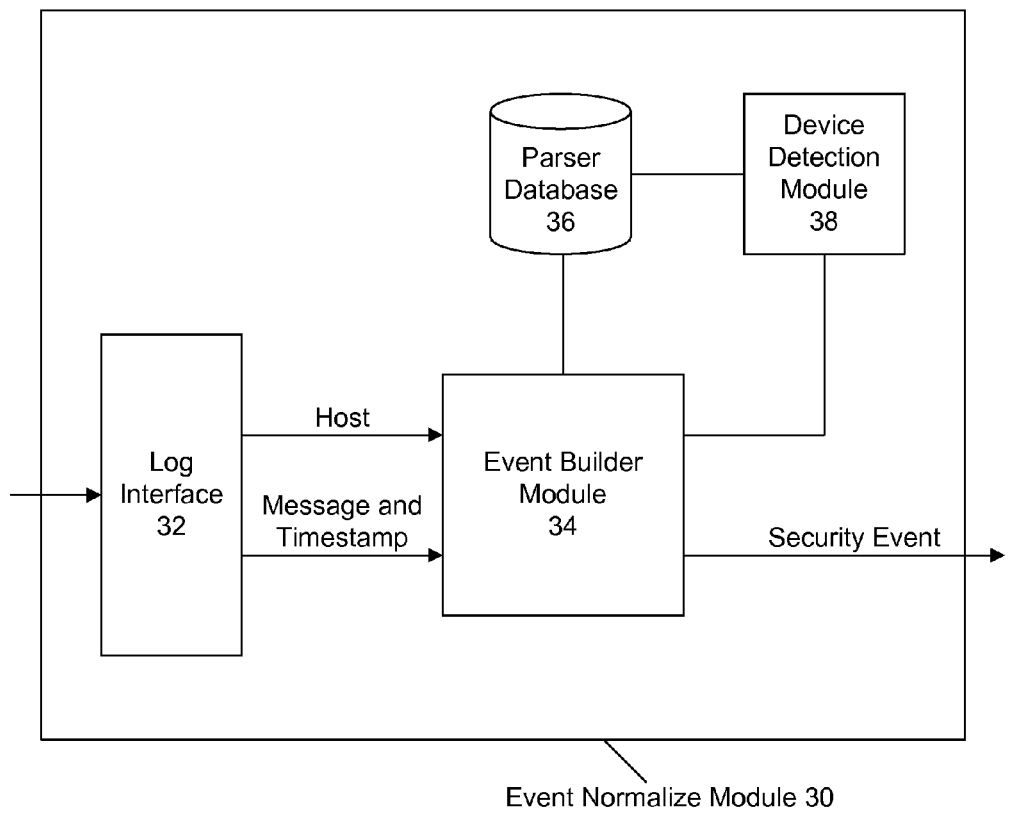
FIG. 3 is a block diagram of an agent normalize module according to one embodiment of the present invention.

FIG. 3 provides a block diagram illustrating some components that can be included in the agent normalize module described in U.S. patent application Ser. No. 10/308,548 referenced above. As described in the referenced application, one function of the agent normalize module is to build a normalized security event according to a common schema using various "raw events," such as message log entries.

In one embodiment, the agent 12 is configured to monitor a message log device, such as a Syslog. In one embodiment, the agent 12 has an event normalize module 30 that includes a log interface 32 configured to read the message entries contained in the message log. In one embodiment, the log interface 32 provides each message with the host associated with the message by the log to an event builder module 34. The timestamp may also be provided.

The event builder module 34 attempts to parse the message by accessing a parser database 36. In one embodiment, the parser database 36 includes a list of parsers associated with each known host. The database also contains a comprehensive list of all available parsers and need not be implemented as a database. Initially, there may not be any known hosts, but as the agent mines the log, the hosts sending messages to the log become known, and various parsers become associated with each host. Thus, in one embodiment, the event builder module 34 first accesses the list of parsers associated with the host. If the message is successfully parsed using one of these parsers, the data extracted from the parsed event is used to generate a normalized security event.

If the message was not parsed successfully, the event builder module 34 can direct a device detection module 38 to discover the appropriate parser to use by performing a brute-force parsing of the message using all the available parsers until the correct parser is found. The device detection module 38, upon finding a parser that works on the message, adds this parser, and any other parser associated with the device type of the found parser, to the list of parsers that are associated with the host. The event builder module 34 can then build a normalized security event by parsing the message using the parser identified by the device detection module.

Referring again to FIG. 2, hosts that send messages directly to the message log will generally only have one parser (or one set of parsers associated with the host device type) associated with them. In their cases, processing only traverses the block 102-104-106-108 loop, thus saving time. In one embodiment, if a host is unknown, processing begins at block 112 and proceeds from there according to FIG. 2. In one embodiment, a host that forwards messages from various devices and services will have a list of parsers associated with the host identifier.

Figure 4:
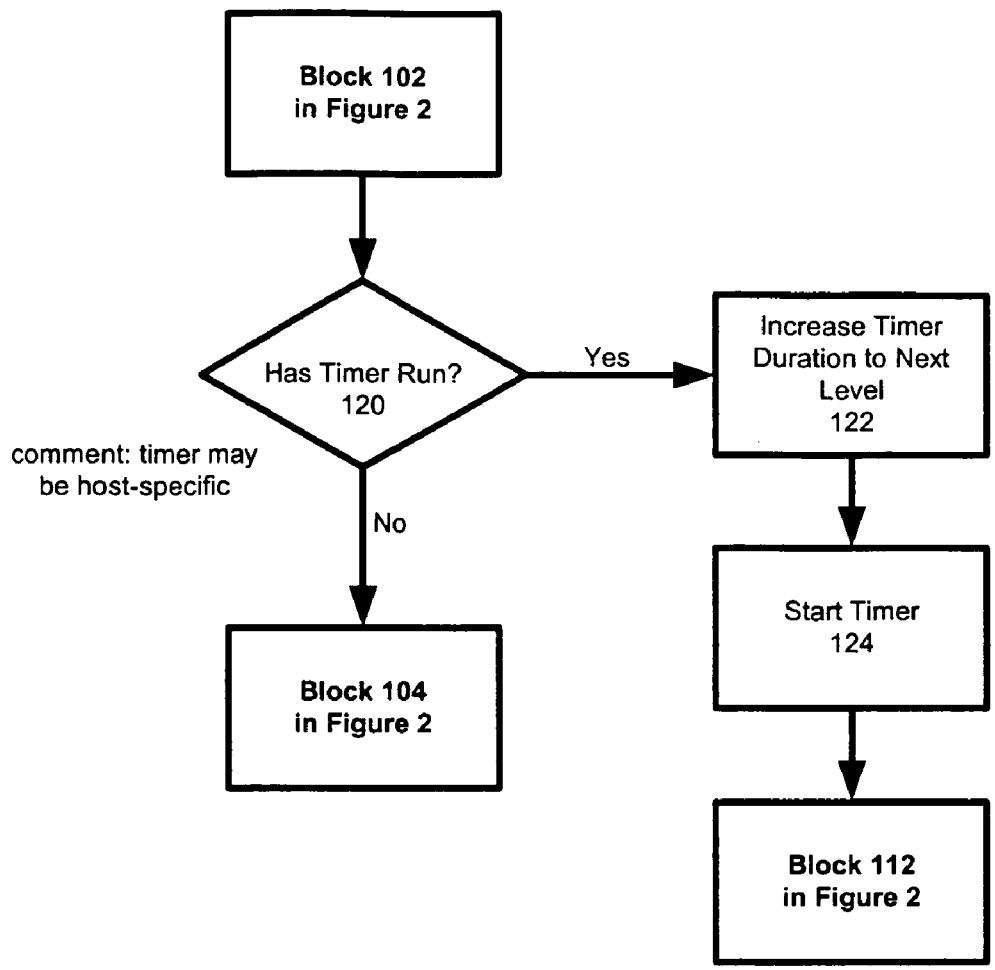
FIG. 4 is a flow diagram further illustrating message processing according to another embodiment of the present invention.

In one embodiment, device types are re-discovered periodically, whether required by the previously described processing or not. One such embodiment is described with reference to FIG. 4. FIG. 4 is a flow chart illustrating an extension of FIG. 2. After block 102 in FIG. 2—the reading of the next message, in block 120, a determination is made as to whether a timer has run. The timer could be a general timer, or it could be a timer specifically associated with the host that logged the message read in block 102. If the timer has not run, processing proceeds from block 104 in FIG. 2.

However, if the timer has run, then, in one embodiment processing proceeds at block 112 in FIG. 2, with the detection of the device type of the message's originator. In another embodiment, illustrated in FIG. 4, if the timer has run, then in block 122 the timer is reset to a next-level duration, which may be longer than the previous duration of the timer in order to decrease the frequency of device discovery. In another embodiment, if the device detection detects a device whose parser is not currently associated with the host, the next-level duration for the timer is set shorter than the previous time. However, in this embodiment, if the device detection detects a device whose parser is currently associated with the host, the next-level duration for the timer is set longer than the previous time.

The timer is then started in block 124, and processing proceeds with device detection in block 112 in FIG. 2. Other embodiments of the present invention can implement various other timers as well. For example, a timer could be associated with each parser on the list of parsers associated with the host. In one such embodiment, if a parser has not been used for the duration of such a timer, the parser may be removed from the list of parsers associated with the host.

Thus, a process and apparatus for message parsing in a network security system has been described. In the forgoing description, various specific values and data structures were given names, such as "security event" and "message log," and various specific modules, such as "agents" and "parser database" have been described. However, these names are merely to describe and illustrate various aspects of the present invention, and in no way limit the scope of the present invention. Furthermore, various modules, such as the manager 14, and the agents 12 in FIG. 1, can be implemented as software or hardware modules, or without dividing their functionalities into modules at all. The present invention is not limited to any modular architecture either in software or in hardware, whether described above or not.

What is claimed is:

1. A method performed by a distributed agent of a network security system, the method comprising:
    accessing a message in a message log, wherein the message log associates a host identifier with the message, the host identifier being an identifier of a host that sent the message to the message log;
    accessing a host-specific list of multiple parsers associated with the host identifier associated with the message;
    the agent attempting to parse the message using a first parser in the host-specific list;
    responsive to unsuccessful parsing using the first parser, attempting to parse the message using a second parser in the host-specific list;
    responsive to unsuccessful parsing using all the parsers in the host-specific list:
        attempting to parse the message using a parser in a comprehensive list of multiple parsers; and
        responsive to successful parsing using the parser in the comprehensive list, adding the parser to the host-specific list.

2. The method of claim 1, wherein the message log comprises a text-based message log.

3. The method of claim 2, wherein the message log comprises a Syslog.

4. The method of claim 1, wherein the host identifier comprises an Internet protocol (IP) address.

5. The method of claim 1, further comprising:
    detecting that a timer associated with the host has run; and
    in response to having detected the running of the timer, attempting to parse the message using a parser in the comprehensive list.

6. The method of claim 5, further comprising responsive to successful parsing using the parser in the comprehensive list, adding the parser in the comprehensive list to the host-specific list if the parser associated with the successful parsing of the message was not already on the host-specific list of multiple parsers.

7. The method of claim 1, further comprising building a normalized event using the parsed message.

8. The method of claim 7, wherein building the normalized event further uses the host identifier.

9. The method of claim 1, wherein attempting to parse the message using the parsers from the host-specific list of multiple parsers proceeds according to a hierarchy of more specific parsers to more general parsers.

10. The method of claim 9, wherein adding the parser associated with the successful parsing of the message to the host-specific list of multiple parsers comprises adding the parser in a manner that respects the hierarchy of the host-specific list.

11. The method of claim 1, wherein attempting to parse the message using the parsers from the comprehensive list of multiple parsers proceeds according to a hierarchy of more specific parsers to more general parsers.

12. A distributed agent for a network security system, the distributed agent comprising:
   a log interface coupled to a message log to read a message and a host identifier of the sender of the message from the message log into the distributed agent;
   a parser database stored on a non-transitory machine-readable medium containing a host-specific list of multiple parsers associated with the host identifier;
   an event builder module coupled to the log interface and the parser database to attempt to parse the message using a first parser from the host-specific list of multiple parsers, and responsive to unsuccessful parsing using the first parser, the event builder configured to parse the message using a second parser in the host-specific list; and
   a device detection module to attempt to parse the message using a parser in a comprehensive list of multiple parsers in case the attempted parsing using the parsers in the host-specific list is unsuccessful for all parsers, and responsive to successfully parsing the message with a parser in the comprehensive list, the device detection module configured to add the parser to the host-specific list.

13. The distributed agent of claim 12, wherein the event builder module is further configured to build a normalized event by using the parsed message.

14. The distributed agent of claim 12, wherein the message log comprises a text-based message log.

15. The distributed agent of claim 14, wherein the message log comprises a Syslog.

16. The distributed agent of claim 12, wherein the host identifier comprises an Internet protocol (IP) address.

17. The distributed agent of claim 12, wherein the event builder module directs the device detection module to attempt to parse the message using a parser in the comprehensive list in response to having detected the running of a timer associated with the host identifier.

18. The distributed agent of claim 12, wherein the host-specific list of multiple parsers in the parser database is organized according to a hierarchy of more specific parsers to more general parsers.

19. The distributed agent of claim 12, wherein the comprehensive list of multiple parsers in the parser database is organized according to a hierarchy of more specific parsers to more general parsers.

20. A non-transitory machine-readable medium having stored thereon data representing instructions that, when executed by a processor, cause the processor to perform operations comprising:
   accessing a message in a message log, wherein the message log associates a host identifier with the message, the host identifier being an identifier of a host that sent the message to the message log;
   accessing a host-specific list of multiple parsers associated with the host identifier associated with the message;
   attempting to parse the message using a first parser in the host-specific list;
   responsive to unsuccessful parsing using the first parser, attempting to parse the message using a second parser in the host-specific list;
   responsive to unsuccessful parsing using all the parsers in the host-specific list:
      attempting to parse the message using a parser in a comprehensive list of multiple parsers; and
      responsive to successful parsing using the parser in the comprehensive list, adding the parser to the host-specific list.

21. The non-transitory machine-readable medium of claim 20, wherein the message log comprises a text-based message log.

22. The machine-readable medium of claim 21, wherein the message log comprises a Syslog.

23. The non-transitory machine-readable medium of claim 20, wherein the host identifier comprises an Internet protocol (IP) address.

24. The non-transitory machine-readable medium of claim 20, wherein the instructions further cause the processor to detect that a timer associated with the host has run, and in response to having detected the running of the timer, attempt to parse the message using a parser in the comprehensive list.

25. The non-transitory machine-readable medium of claim 24, wherein the instructions further cause the processor to add the parser in the comprehensive list, where the parser results in successful parsing of the message, to the host-specific list of multiple parsers if the parser associated with the successful parsing of the message were not already on the host-specific list of multiple parsers.

26. The non-transitory machine-readable medium of claim 20, wherein the instructions further cause the processor to build a normalized event using the parsed message.

27. The non-transitory machine-readable medium of claim 26, wherein building the normalized event further uses the host identifier.

28. The non-transitory machine-readable medium of claim 20, wherein attempting to parse the message using the parsers from the host-specific list of multiple parsers proceeds according to a hierarchy of more specific parsers to more general parsers.

29. The non-transitory machine-readable medium of claim 28, wherein adding the parser associated with the successful parsing of the message to the host-specific list of multiple parsers comprises adding the parser in a manner that respects the hierarchy of the host-specific list.

30. The non-transitory machine-readable medium of claim 20, wherein attempting to parse the message using the parsers from the comprehensive list of multiple parsers proceeds according to a hierarchy of more specific parsers to more general parsers.

* * * * *

UNITED STATES PATENT AND TRADEMARK OFFICE
CERTIFICATE OF CORRECTION

| | | |
|---|---|---|
| PATENT NO. | : 7,844,999 B1 | Page 1 of 1 |
| APPLICATION NO. | : 11/070024 | |
| DATED | : November 30, 2010 | |
| INVENTOR(S) | : Hector Aguilar-Macias and Rajiv Subrahmanyam | |

It is certified that error appears in the above-identified patent and that said Letters Patent is hereby corrected as shown below:

On the face page under Item (73) Assignee, please delete "Sunnyvale, CA (US)" and insert
    --Cupertino, CA (US)--.

Signed and Sealed this

First Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,844,999 B1 | Page 1 of 1 |
| APPLICATION NO. | : 11/070024 | |
| DATED | : November 30, 2010 | |
| INVENTOR(S) | : Hector Aguilar-Macias et al. | |

It is certified that error appears in the above-identified patent and that said Letters Patent is hereby corrected as shown below:

In column 9, line 32, in Claim 12, delete "parsers," and insert -- parsers; --, therefor.

In column 10, line 26, in Claim 22, after "The" insert -- non-transitory --.

Signed and Sealed this
Third Day of January, 2012

David J. Kappos
*Director of the United States Patent and Trademark Office*